(12) United States Patent
Kovenat et al.

(10) Patent No.: US 12,457,246 B2
(45) Date of Patent: *Oct. 28, 2025

(54) NETWORK CONNECTIVITY POLICY MANAGEMENT SYSTEM

(71) Applicant: Cisco Technology, Inc., San Jose, CA (US)

(72) Inventors: Daniel Boris Kovenat, New Rochelle, NY (US); Dheepak Ramanujam, Jersey City, NJ (US); Michael Joel O'Connor, Chicago, IL (US)

(73) Assignee: Cisco Technology, Inc., San Jose, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 18/495,429

(22) Filed: Oct. 26, 2023

(65) Prior Publication Data

US 2024/0056420 A1   Feb. 15, 2024

Related U.S. Application Data

(63) Continuation of application No. 17/246,413, filed on Apr. 30, 2021, now Pat. No. 11,848,912, which is a
(Continued)

(51) Int. Cl.
*H04L 9/40* (2022.01)
*H04L 41/0894* (2022.01)
(Continued)

(52) U.S. Cl.
CPC .......... *H04L 63/20* (2013.01); *H04L 41/0894* (2022.05); *H04L 41/12* (2013.01);
(Continued)

(58) Field of Classification Search
CPC ... H04L 63/0209; H04L 41/12; H04L 61/256; H04L 63/0263; H04L 63/20
See application file for complete search history.

(56) References Cited

U.S. PATENT DOCUMENTS 11,025,590 B1 *  6/2021  Kovenat ................. H04L 63/20
11,848,912 B2 * 12/2023  Kovenat ................. H04L 41/12
(Continued)

FOREIGN PATENT DOCUMENTS

JP   2002261788 A   9/2002
JP   2008219419 A   9/2008

OTHER PUBLICATIONS

Bartal, Y. et al., "Firrnato: A Novel Firewall Management Toolkit," ACM Transactions on Computer Systems, Nov. 2004, pp. 381-420, vol. 22, No. 4.
(Continued)

*Primary Examiner* — Oleg Korsak
(74) *Attorney, Agent, or Firm* — Polsinelli P.C.

(57) ABSTRACT

A network security system implements connectivity policies of a network environment. The network security system may use a network topology mapping to implement connectivity policies, where the network topology mapping includes sets of security zones, security devices, and zone paths between the security zones via the one or more security devices. The network security system can generate a universal representation of a connectivity policy for the network environment using a universal syntax. Using the network topology mapping, the network security system can identify zone paths between the security zones for implementing the connectivity policy. The network security system can configure security devices along the zone paths in accordance with the connectivity policies. Configuring security devices may include converting some or all of the universal representation of the connectivity policy into a device-specific representation in a native syntax of the security device.

20 Claims, 11 Drawing Sheets

Related U.S. Application Data continuation of application No. 16/997,829, filed on Aug. 19, 2020, now Pat. No. 11,025,590.

(51) Int. Cl.
*H04L 41/12* (2022.01)
*H04L 61/256* (2022.01)

(52) U.S. Cl.
CPC ........ *H04L 61/256* (2013.01); *H04L 63/0209* (2013.01); *H04L 63/0263* (2013.01)

(56) References Cited

U.S. PATENT DOCUMENTS

| | | |
|---|---|---|
| 2003/0120955 A1 | 6/2003 | Bartal et al. |
| 2009/0276843 A1 | 11/2009 | Patel |
| 2014/0359693 A1 | 12/2014 | Lemke et al. |
| 2020/0120143 A1 | 4/2020 | Nicoll et al. |
| 2020/0177550 A1 | 6/2020 | Valluri et al. |
| 2020/0177638 A1 | 6/2020 | Salman et al. |
| 2020/0358813 A1* | 11/2020 | Hasumi .................. H04L 63/20 |

OTHER PUBLICATIONS

Check Point Software Technologies Ltd., "Firewall Administration Guide R76," Feb. 14, 2013, 115 pages.
PCT International Search Report and Written Opinion, PCT Application No. PCT/IB2021/054616, Aug. 31, 2021, 13 pages.
Soule, R. et al., "Merlin: A Language for Provisioning Network Resources," arXiv preprint arXiv: 1407.1199vl, Jul. 4, 2014, 12 pages.
United States Office Action, U.S. Appl. No. 16/997,829, Nov. 17, 2020, 17 pages.
United States Office Action, U.S. Appl. No. 17/246,413, Feb. 21, 2023, 14 pages.
United States Office Action, U.S. Appl. No. 17/246,413, Jun. 28, 2023, 6 pages.
Office Action—Notice of Intention to Grant for Australian Application No. 2021327863, dated May 12, 2025, 3 Pages.
Office Action for Australian Application No. 2021327863, dated Oct. 15, 2024, 6 Pages.
Office Action for Japanese Application No. 2023512270, dated Mar. 18, 2025, 9 Pages.
Supplementary European Search Report for European Application No. 21857828.4, dated Sep. 25, 2024, 12 Pages.

* cited by examiner

NETWORK CONNECTIVITY POLICY MANAGEMENT SYSTEM

CROSS-REFERENCE OF RELATED APPLICATIONS

This application is a continuation of U.S. patent application Ser. No. 17/246,413, filed on Apr. 30, 2021, which is a continuation of U.S. patent application Ser. No. 16/997,829, filed on Aug. 19, 2020, now U.S. Pat. No. 11,025,590 issued on Jun. 1, 2021, each of which are hereby incorporated by reference in their entireties.

FIELD OF DISCLOSURE

This disclosure relates generally to computer networking, and, in particular, to management of connectivity policies of a network environment.

BACKGROUND

Computer network environments, such as enterprise network environments, are configured to connect various network environment entities (e.g., computing devices, virtual machines, subnetworks, etc.) in accordance with one or more connectivity policies. Implementing connectivity policies in a network environment generally includes individually configuring various security devices, such as firewalls, along routes between network entities to allow or prevent connections. Different security devices in a network environment may have device-specific protocols for implementing connectivity policies. For instance, security devices manufactured by different vendors use vendor-specific syntax to represent and implement connectivity policies. As such, manually configuring individual security devices in order to satisfy network connectivity policies for a network environment is a demanding and inefficient process. Furthermore, it may not be clear to a network administrator what security devices can or should be configured in order to implement one or more connectivity policies, especially as network environment complexity increases. As such, improved systems for managing connectivity policies in network environments are needed.

SUMMARY

A method, system, and computer-readable storage medium are disclosed for universal management of connectivity policies for a network environment. A network security system generates a network topology mapping of a network environment to implement connectivity policies for a network environment. The network security system can generate a mapping of the network topology of the network environment and use the network topology mapping to implement connectivity policies. The network topology mapping represents the network environment as a set of security zones, security devices, and zone paths between the security zones via one or more security devices. The network security system generates a universal representation of a connectivity policy for the network environment using a universal syntax (e.g., a language for representing connectivity policies). Using the network topology mapping, the security system identifies network paths between the security zones for implementing the connectivity policy. In order to implement the connectivity policy in the network environment, the network security system configures security devices along the identified zone paths by translating some or all of the universal representation of the connectivity policy into a device-specific representation in a native syntax of the security device.

In one embodiment the network security system receives a network connectivity policy for a network environment including a plurality of network addresses, the connectivity policy corresponding to a source network address and a destination network address of the plurality of network addresses. The network security system generates a universal representation of the network connectivity policy in a universal syntax of the security system. Using a network topology mapping, the network security system identifies a security device in the network environment along a network zone path between a security zone including the source network address and a security zone including the destination network address. The security system generates, from the universal representation, a native representation of the network connectivity policy in a native syntax associated with the identified security device. The network security system configures the security device to allow communication between the source network address and the destination network address using the generated native representation.

In one embodiment, the network security system identifies routing information of one or more security devices describing a set of routes to one or more network addresses the one or more security devices are configured to use. Using the routing information, the network security system determines a plurality of security zones of the network environment which each include one or more network addresses. Additionally, using the routing information, the network security system determines a set of possible zone paths for the network environment which each connect one or more network addresses of a pair of security zones of the plurality of security zones through one or more security devices. The set of possible zone paths include an active zone path that includes one or more security devices that are permitted to allow communication between the one or more network addresses connected by the active zone path. The set of zone paths also include an alternate zone path that includes one or more security devices that are permitted to allow communication between the one or more network addresses connected by the alternate zone path if the active zone path is not available. Using the set of possible zone paths, the network security system generates a network topology mapping for the network environment.

In one embodiment, a client device receives a network topology mapping for a network environment from a network security system. The network topology mapping includes security zones connected by zone paths through one or more security devices. The client device receives a connectivity policy for the network environment based on a user interaction with the client device, where the connectivity policy specifies a source network address in a first security zone of the plurality of security zones and a destination network address in a second address in a second security zone of the plurality of security zones. The client device provides the connectivity policy to the network security system. The client device receives a notification from the network security system indicating that one or more security devices along one or more zone paths from the source network address and the destination network address are configured based on the connectivity policy.

DETAILED DESCRIPTION

Reference will now be made to several embodiments, examples of which are illustrated in the accompanying figures. It is noted that wherever practicable similar or like reference numbers are used in the figures to indicate similar or like functionality. Also, where similar elements are identified by a reference number followed by a letter, a reference to the number alone in the description that follows may refer to all such elements, any one such element, or any combination of such elements. One skilled in the art will readily recognize from the following description that alternative embodiments of the structures and methods may be employed without departing from the principles described.

System Environment

Figure 1:
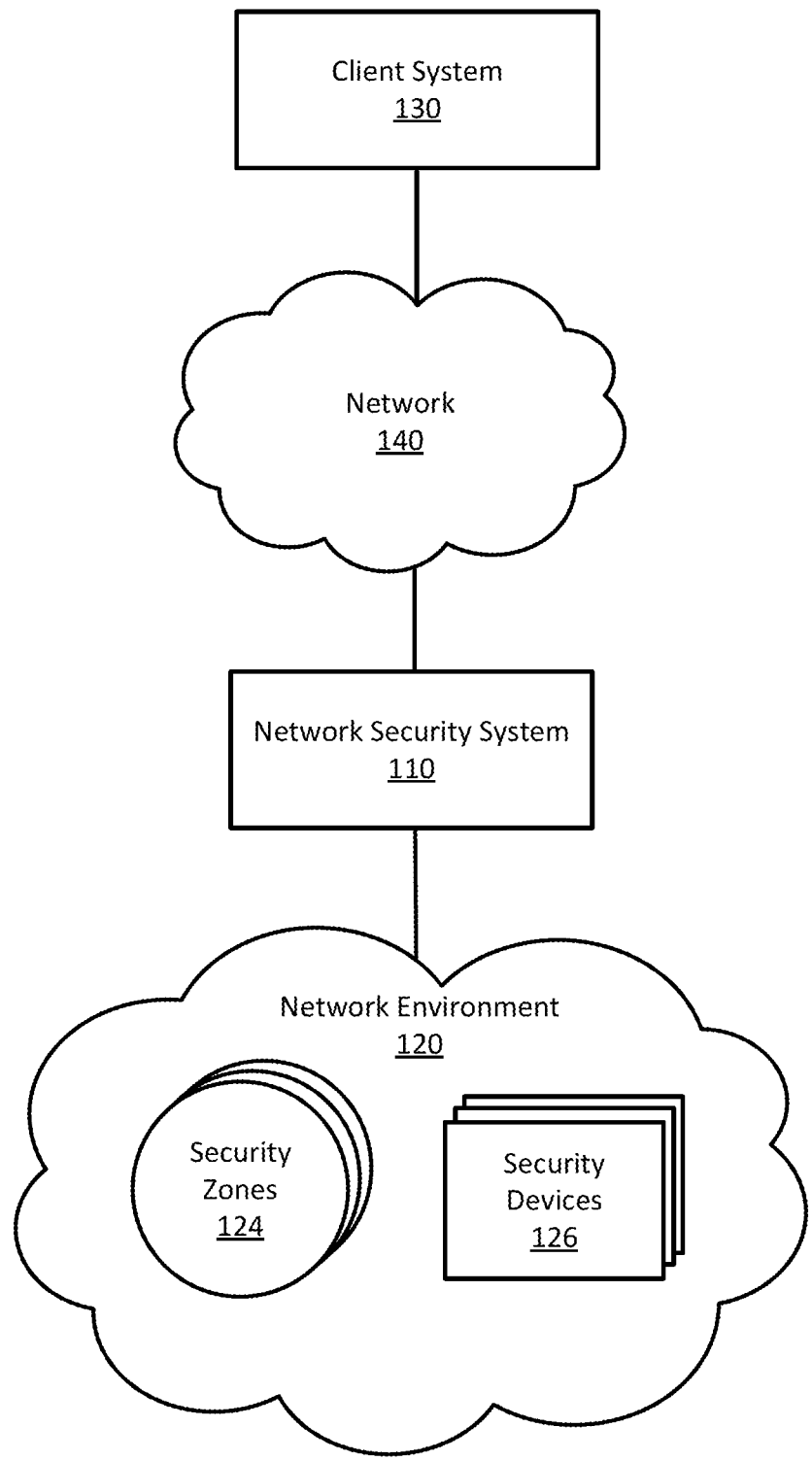
FIG. 1 illustrates a computing environment for managing network environment connectivity policies, according to an embodiment.

FIG. 1 illustrates one embodiment of a computing environment 100 for managing network environment connectivity policies. In the embodiment shown, the computing environment 100 includes a network security system 110, a network environment 120, a client system 130, and a network 140. In other embodiments, the computing environment 100 may include different or additional elements. Furthermore, the functionality may be distributed among the elements in a different manner than described.

The network security system 110 manages connectivity policies for the network environment 120. The network security system 110 may include one or more computing devices configured to receive connectivity policies for the network environment 120 from the client system 130 via the network 140. In embodiments, the network security system 110 generates a mapping of the network topology for the network environment 120 (i.e., a network topology mapping) and uses the network topology mapping to implement connectivity policies received from the client system 130 in the network environment 120. Generating and using a network topology mapping for the network environment 120 is described in greater detail below with reference to FIGS. 2 and 4A-E. The network security system 110 can receive or obtain connectivity policies from the client system 130, third-party systems, or any other system authorized to provide connectivity policies for the network environment 120. Connectivity policies may be provided by human administrators (e.g., via a user interface or other connectivity policy-authoring system), or automatically generated based on a process of the network environment 120 (e.g., a new network entity, such as virtual machine, is added to the network environment 120). Additionally, the network security system 110 can implement connectivity policies which depend on external data (e.g., provided by the client system 130 or third-party systems), in which case the network security system 110 can request or otherwise obtain the relevant data to implement and update the external data dependent connectivity policies. For example, a connectivity policy of the network environment 120 may depend on a black-list or white-list of networks or subnetworks provided by a third-party, such as a legal authority over particular area or type of network communications (e.g., the Office of Foreign Assets Control).

In general, network connectivity policies specify which network entities (e.g., computing devices, virtual machines, applications, etc.) of a network environment (e.g., the network environment 120) are permitted to communicate with other network entities. Network entities are identified within the network environment 120 based on various identifiers (i.e., network addresses), such as IP addresses or port numbers. As an example, connectivity policies can specify which IP addresses or subnetworks (e.g., subnetworks within the network environment 120) can communicate with other IP addresses or subnetworks, which application ports can communicate with other application ports, and with what communication protocols, or any combination thereof. The network security system 110 represents connectivity policies using a universal syntax for the network environment 120 (i.e., a universal representation). The universal syntax describes connectivity policies in a format that applies to all to elements of the network environment 120. Given a connectivity policy represented in the universal syntax, the network security system 110 implements the connectivity policy in the network environment by identifying one or more appropriate security devices 126 and configuring the identified security devices using the universal connectivity policy. In embodiments, the network security system 110 configures a security device 126 by converting some or all of the universal connectivity policy to a native connectivity policy syntax of the security device 126 (i.e., a native representation). The native syntax describes connectivity policies in a format that is used to implement connectivity policies on individual security device 126. Implementing connectivity policies on the security devices 126 is described in greater detail below with reference to FIGS. 2-3, 5, and 7. Although FIG. 1 shows a single element, the network security system 110 may include one or multiple computing devices, such as a server cluster, and the computing devices may be located in one or more physical locations. The network security system may also represent one or more virtual computing instances that execute using one or more computers in a datacenter such as a virtual server farm.

The network environment 120 is a region of a computer network connecting a set of computing devices via local area or wide area networks based on one or more connectivity policies. The network environment 120 includes security zones 124 and one or more security devices 126. The one or more connectivity policies of the network environment 120 specify communication rules for network entities of the network environment 120. For instance, a connectivity policy can specify that a computing device with IP address A can or cannot communicate with a computing device with IP address B. In some embodiments, the network environment 120 corresponds to a network for an organization, such as an enterprise network. The network environment 120 can further be configured to operate using any combination of systems and processes described below with respect to the network 140.

The security zones 124 are logical sub-regions of the network environment 120 including network entities (e.g., computing devices corresponding to respective IP addresses) which can communicate without their communications going through one of the security devices 126. As such, the security zones 124 are bordered by the security devices 126, and communications between network entities in different security zones 124 are sent via network zone paths through one or more of the security devices 126. In some cases, multiple security zones of the security zones 124 may include the same network entities, such as two security zones 124 which include a computing device corresponding to the same IP address). In some embodiments, one or more entities in a security zone 124 are connected to an external network entity (e.g., a third-party application or system).

The security devices 126 monitor and control network traffic within the network environment 120 according to one or more connectivity policies. The security devices 126 may be any type of device which filter network traffic, such as packet filter firewalls, circuit-level gateways, stateful inspection firewalls, application-level gateways/proxy server firewalls, or next-generation firewalls. In embodiments, the security devices 126 filter network communications going between network entities corresponding to different security zones 124 or entities outside the network environment 120. The security devices 126 may represent connectivity policies using a native syntax (i.e., a native connectivity policy). The native syntax for a given security device 126 may depend on the particular type of security device or manufacturer of the security device (i.e., a security device vendor). Furthermore, the security device 126 may include security devices which use different native syntax to represent native connectivity policies. The security devices 126 have one or more device interfaces for receiving incoming data from network entities and routing outgoing data to network entities.

The client system 130 is a computing system configured to provide connectivity policies to the network security system 110 for the network environment 120. The client system 130 consists of one or more computing devices which communicate with the network security system 110 via the network 140. Example computing devices include a server computer, a laptop computer, a desktop computer, a mobile device (e.g. a phone or tablet). Although the client system 130 is depicted as a single element in FIG. 1, the one or more computing devices of the client system 130 may operate independently from each other or provide connectivity policies to the network security system 110 independently of each other. In embodiments, the client system 130 receives or obtains information describing one or more connectivity policies from the client system 130. In particular, connectivity policies may be generated and provided by users of the client system 130 (e.g., administrators of the network environment 120) via a user interface (e.g., displayed by a computing device) or a connectivity policy generation system (e.g., a version controlled connectivity policy system). The client system 130 provides the received information to the network security system 110. The received information may describe the network connectivity policies using the universal syntax of the network security system 110, or may instead describe the connectivity policies using another format. In the same or different embodiments, the client system 130 receives information from the network security system 110 describing the network environment 120, such as information included in the network topology, network traffic reports, security alerts, or other network security information. In an alternative embodiment to that depicted in FIG. 1, the client system 130 may be integrated directly with the network security system 110.

The network 140 comprises any combination of local area and/or wide area networks, using both wired and/or wireless communication systems. In some embodiments, the network 140 includes the network environment 120. The network 140 may employ various communications technologies and/or protocols. For example, the network 140 may utilize communication technologies such as Ethernet, 802.11, 3G, 4G, digital subscriber line (DSL), etc. The network 140 may also employ network protocols for communicating information. Some example protocols may include the internet protocol suite (TCP/IP), Ethernet/Industrial protocol (EtherNet/IP), hypertext transport protocol secure (HTTPS), representation state transfer (REST), simple mail transfer protocol (SMTP), file transfer protocol (FTP), etc. Data exchanged over the network 140 may be represented using any suitable format, such as hypertext markup language (HTML), JavaScript Object Notation (JSON), or extensible markup language (XML). In some embodiments, all or some of the communication links of the network 140 may be encrypted using any suitable technique or techniques.

Figure 2:
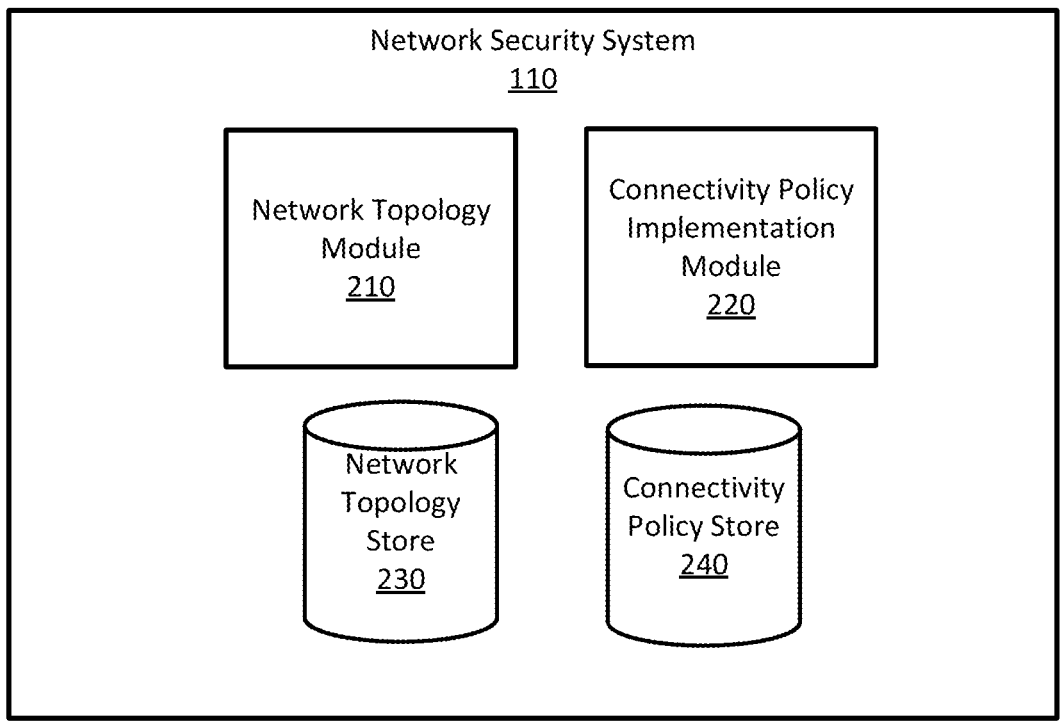
FIG. 2 is a block diagram illustrating a network security system, according to an embodiment.

FIG. 2 is an embodiment of a block diagram illustrating a network security system 110. In the embodiment shown, the network security system 110 includes a network topology module 210, a connectivity policy implementation module 220, a network topology store 230, and a connectivity policy store 240. In other embodiments, the network security system 110 may include different or additional elements. Furthermore, the functionality may be distributed among the elements in a different manner than described.

The network topology module 210 generates and maintains a network topology mapping for the network environment 120. In embodiments, the network topology module 210 performs an initial discover process to generate the network topology mapping by discovering the security zones 124, security devices 126, and network zone paths of the network environment 120. As part of the discovery process, the network topology module 210 can analyze routing information provided by the security devices 126 (e.g., routing tables of the security devices 126) in order to infer a structure of the network environment 120. The initial process of generating the network topology mapping is described in greater detail below with reference to FIGS. 4A-4E. The network topology module 210 stores the network topology mapping in the network topology store 230. In particular, the network topology mapping includes, but is not limited to, information describing the security zones 124 (e.g., the network addresses of the computing devices in each security zone), the security devices 126 (e.g., the characteristics of the security devices 126 and their connections to the security zones 124), and possible paths of communication between the security zones 124 through one or more security devices 126 (i.e., zone paths). In some embodiments, the network topology module 210 generates and maintains multiple network topology mappings corresponding to multiple network environments.

The network topology module 210 can further monitor the network environment 120 for changes to elements of the network environment 120 and updates the stored network topology mapping accordingly. In particular, the network topology module 210 can periodically execute some or all of the discovery process to check for changes in the network environment 120. For example, the network topology module 210 may re-generate some or all of the network topology mapping on a periodic basis (e.g., once an hour) or based on information provided by network entities to the network environment 120 (e.g., a change log provided by the security devices 126). In this case, the network topology module 210 compares the re-generated network topology mapping to the previously generated network topology mapping stored in the network topology store 230 and update the stored mapping if differences are identified. Additionally, or alternatively, the network topology module 210 can receive information describing changes to the network environment 120 (e.g., from the client system 130) and update the stored network topology mapping based on the received information. For example, an administrator of the network environment 120 may submit changes to the network topology, such as the addition of a new virtual machine, subnetwork, or other network entity to the network environment 120. In one embodiment, the network topology module 210 automatically updates the network topology mapping when it detects changes and then requests an administrator review the changes (e.g., at the client system 130) to determine if there are any discrepancies. The network topology module 210 may provide information describing updates to the network topology mapping to the connectivity policy implementation module 220 in order to implement any changes based on the updates, as described below with reference to the connectivity policy implementation module 220. The network topology module 210 may further provide information included in the network topology mapping to the client system 130.

In some embodiments, the network topology mapping includes additional information describing the network environment 120. In one embodiment, the network topology mapping includes network address translation (NAT) rules for the network environment 120. In particular, the network topology mapping associates specific NAT rules with devices (e.g., routers or security devices) along zone paths that translate addresses from one address space to another address space according to the NAT rules. In the same or different embodiment, the network topology mapping includes information describing connections to external network entities (e.g., third-party systems or applications, the internet, etc.) of the network environment 120. In still further same or different embodiments, the network topology mapping may include tags (e.g., labels) assigned to elements of the network topology mapping (e.g., the security zones 124, the security devices 126, the zone paths, the NAT rules, external entities or connections, etc.). The tags are designated by a user of the client system 130 (e.g., an administrator of the network environment 120) and specify user preferences for network traffic logic in the network environment 120. For example, tags may specify a trust level for an element, a type for an element (e.g., external, internet, etc.), a location of an element within the network environment 120, and any other information which may be used to convey user preferences for network traffic logic.

In some embodiments, the network topology mapping generated by the network topology module 210 designates various types of zone paths in the network environment 120. In particular, during the initial process of generating the network topology mapping, the network topology module 210 can identify all possible zone paths (e.g., according to routing information of the security devices 126) between the security zones 124 of the network environment 120. After or during generation of the network topology mapping, administrators of the network environment 120 can designate (e.g., via the client system 130) whether or not identified zone paths are permitted to allow communication between network addresses connected by the zone paths. For instance, the administrators can indicate whether a zone path is permitted to be used for communication between security zones (i.e., an active zone path), is permitted to be used as an alternative in the event one or more equivalent active zone paths cannot be used (i.e., an alternate zone path), or is not permitted to be used (i.e., a rejected zone path). The network security system 110 may use the designations of zone paths (e.g., active, alternate, or rejected) to determine how security devices on a zone path should be managed or otherwise configured. For example, the network security system 110 can configure a security device 126 to implement connectivity policies with respect to one or more active or alternate paths that include the security device 126. Similarly, the network security system 110 may not take any action to configure the security device 126 with respect to a rejected path that includes the security device 126. Configuring of security devices 126 based on designations of zone paths may be performed by the connectivity policy implementation module 220, as described below.

The connectivity policy implementation module 220 manages connectivity policies for the network environment 120. In embodiments, the connectivity policy implementation module 220 receives connectivity policies from the client system 130 or another connectivity policy provider (e.g., a third-party system) and configures the network environment 120 in order to implement the connectivity policies. The connectivity policy implementation module 220 can implement any number of connectivity policies in the network environment 120. The connectivity policy implementation module 220 represents connectivity policies using a universal syntax, as described above with reference to the network security system 110. In some cases, the connectivity policies are provided to the connectivity policy implementation module 220 in the universal syntax, while in other cases the connectivity policy implementation module 220 converts the connectivity policies from a client-provided format (i.e., a client connectivity policy) to the universal syntax. Client connectivity policies are described in greater detail below with reference to FIG. 3. Based on the universal representation of the connectivity policy, the connectivity policy implementation module 220 uses the stored network topology mapping to identify one or more network zone paths relevant to the connectivity policy. For example, the connectivity policy implementation module 220 may identify one or more active or alternate zone paths connecting a pair of network addresses (e.g., a source and destination address) corresponding to the universal representation of the connectivity policy. The connectivity policy implementation module 220 further implements the connectivity policy by configuring security devices 126 on the identified network zone paths in accordance with the connectivity policy. For example, a connectivity policy may specify that a first IP address in a security zone A should be able to communicate with a second IP address in a security zone B.

In this case, the connectivity policy implementation module 220 can identify one or more network zone paths between the security zones A and B and configure the security devices 126 on the one or more network zone paths to allow communication between the first and second IP addresses. The connectivity policy implementation module 220 configures a particular security device 126 on a network zone path by converting the universal connectivity policy to a native connectivity policy for the particular security device 126. The connectivity policy implementation module 220 uses the native connectivity policy to configure the particular security device 126. For example, the connectivity policy implementation module 220 may provide the native connectivity policy to the particular security device 126 via the network environment 120. The connectivity policy implementation module 220 further stores one or more representations of a received connectivity policy (e.g., the client policy representation, the universal policy representation, one or more native policy representations, etc.) in the connectivity policy store 240. In some embodiments, the connectivity policy implementation module 220 manages the connectivity policies of multiple network environments (e.g., using multiple corresponding network topology mappings stored in the network topology store 230).

In some embodiments, the connectivity policy implementation module 220 uses the network topology mapping to convert a client representation of a received connectivity policy to a universal representation. In particular, the connectivity policy implementation module 220 may identify network addresses of the network entities relevant to a client representation of a connectivity policy (e.g., the relevant network endpoints), such as subnetworks, computing devices, IP addresses, external connections, application ports, or other network entities. For instance, the connectivity policy implementation module 220 can generate a universal representation of a connectivity policy (e.g., a connectivity policy file) by retrieving information from the network topology mapping in the network topology store 230 or communicating with the client system 130 or third-party systems. As an example, a client representation of a connectivity policy may specify that a certain group of employees of an organization should be able to connect to a particular server over a particular transmission control protocol (TCP) port. In this case, the connectivity policy implementation module 220 may use the network topology mapping to identify all of the network entities associated with the group of employees, which protocols to use to connect the network entities, which network zone paths to use to connect the network entities, and the security devices 126 on the identified zone paths. As another example, a client representation of a connectivity policy may reference all subnetworks blocked by a third-party system (e.g., a legal authority), in which case the connectivity policy implementation module 220 may retrieve the blocked subnetworks and their internal network entities and use the retrieved information to generate a universal connectivity policy. As still another example, the client representation of a connectivity policy may specify a connection between a host name and an IP address, in which case the connectivity policy implementation module 220 may resolve the host name to an IP address by querying a domain name system (DNS) of the network environment 120.

In some embodiments, the connectivity policy implementation module 220 identifies the native syntax of a security device 126 to convert the universal representation based on information received or otherwise obtained from the security device 126, such as a security device type (e.g., a firewall device manufacturer) and version (e.g., a particular firewall device product). In the same or different embodiments, the connectivity policy implementation module 220 can perform the conversion based on information included in the zone topology mapping or otherwise obtained indicating whether and how security devices 126 upstream of a relevant security device 126 on a zone path have altered the connectivity policies, such as adjusting IP addresses or protocol information (e.g., based on NAT rules).

In some embodiments, the connectivity policy implementation module 220 receives information describing updates to implemented connectivity policies. For example, an administrator of the client system 130 may add a new rule to an implemented connectivity policy, remove an existing rule from an implemented connectivity policy, or delete an implemented connectivity policy. In these cases, the connectivity policy implementation module 220 may reconfigure one or more of the security devices 126 in accordance with the updates to the connectivity policy. In particular, the connectivity policy implementation module 220 can update the universal representation of the connectivity policy based on the received information. Furthermore, the connectivity policy implementation module 220 can update corresponding native representations of the connectivity policies for one or more security devices 126 using the updated universal connectivity policy, and use the updated native representations to reconfigure the corresponding security devices 126.

In the same or different embodiments, the connectivity policy implementation module 220 receives information describing updates to the network topology mapping from the network topology module 210, as described above. In this case, the connectivity policy implementation module 220 may similarly reconfigure one or more of the security devices 126 in accordance with the updates to the network topology mapping. As described above for updates to a connectivity policy, the connectivity policy implementation module 220 can update universal representations and native representations of connectivity policies based on updates to the network topology mapping, and reconfigure relevant security devices 126 using the updated native representations. In one embodiment, the connectivity policy implementation module 220 configures security devices 126 included in alternative zone paths based on the received update information. For example, the connectivity policy implementation module 220 may configure one or more security devices 126 of an alternate zone path to account for the unavailability of the active zone path, such as rerouting network traffic through the alternate zone paths if the active zone path fails. In some cases, connectivity policies implemented by the connectivity policy implementation module 220 may reference elements of the network topology mapping (e.g., network addresses, security devices, security zones, zone paths, etc.) stored in the network topology store 230. If the connectivity policy module receives updates to the referenced elements from the network topology module 210 (e.g., a referenced IP address or application port is removed from the network environment 120), the connectivity policy implementation module 220 can responsively reconfigure one or more security devices 126 to re-implement the connectivity policies which reference the updated elements. In order to reconfigure one or more security devices 126 based on information describing connectivity policy updates, as described above, the connectivity policy implementation module 220 can remove individual connectivity policy rules or entire connectivity policies from one or more security devices 126, and additionally or alternatively add connectivity policy rules or entire connectivity policies to one or more of the same or different security devices 126.

In some embodiments, the connectivity policy implementation module 220 accounts for NAT rules of the network environment 120 when converting the universal representation of the connectivity policy to one or more native representations. For example, the connectivity policy implementation module 220 may apply the NAT rules associated with a security device 126 when generating a native representation of a connectivity policy to configure the security device 126. Additionally, the connectivity policy implementation module 220 can use the NAT rules associated with an upstream security device on a given network zone path to generate native connectivity policies for one or more downstream security devices on the same network zone path. The connectivity policy implementation module 220 may use NAT rules to generate native representations of a connectivity policy differently depending on the particular security device (e.g., the security device manufacturer) or whether the security device is downstream from the security device associated with the NAT rule on a relevant network zone path.

In some embodiments, the connectivity policy implementation module 220 provides information to the client system 130 describing the implementation of a network connectivity policy. In particular, the connectivity policy implementation module 220 can provide information to the client system 130 indicating that a connectivity policy provided by the client system 130 to the connectivity policy implementation module 220 was successfully implemented. Additionally, the connectivity policy implementation module 220 can provide information describing changes to the network topology of the network environment 120 or adjustments to the implementation of the connectivity policy (e.g., changes in zone paths used, security devices 126 used, etc.).

In some embodiments, the connectivity policy implementation module 220 analyzes connectivity policies currently implemented for the network environment 120 in order to implement a newly received connectivity policy. For instance, the connectivity policy implementation module 220 may receive a connectivity policy (e.g., from the client system 130) which requests connectivity between two network entities via a zone path designated as a rejected zone path in the network topology mapping. In this case, the connectivity policy module 220 may notify the provider of the connectivity policy or administrators of the network environment 120 that the connectivity policy could not be implemented. As such, the connectivity policy request may be reviewed and the rejected zone path may be re-designated as an active zone path, or the connectivity policy may not be allowed.

In some embodiments, the connectivity policy implementation module 220 combines connectivity policies received or otherwise obtained from the same or different sources (i.e., connectivity policy channels) in order to configure a security device 126. For instance, the client system 130 may provide connectivity policies to the connectivity policy implementation module 220 submitted by an administrator through a user interface and provided via an API. Additionally, the connectivity policy implementation module 220 may receive or obtain connectivity policies via other sources, or information informing connectivity policies, from the client system 130 or other systems. In these cases, the connectivity policy implementation module 220 can combine connectivity policies received from multiple channels in order to configure the network environment 120 to implement the connectivity policies. For instance, the connectivity policy implementation module 220 may generate a single universal representation for multiple connectivity policies received from the same or different connectivity policy channels. In the same or different embodiments, the connectivity policy implementation module 220 may append one or more mandated connectivity policies to each universal representation of a received connectivity policy. For example, a legal authority may mandate by law that the network environment 120 cannot communicate with certain network entities. In this case, the connectivity policy implementation module 220 can add one or more corresponding mandated connectivity policies to universal representations of received connectivity policies in order to ensure these mandated requirements are met.

Figure 3:
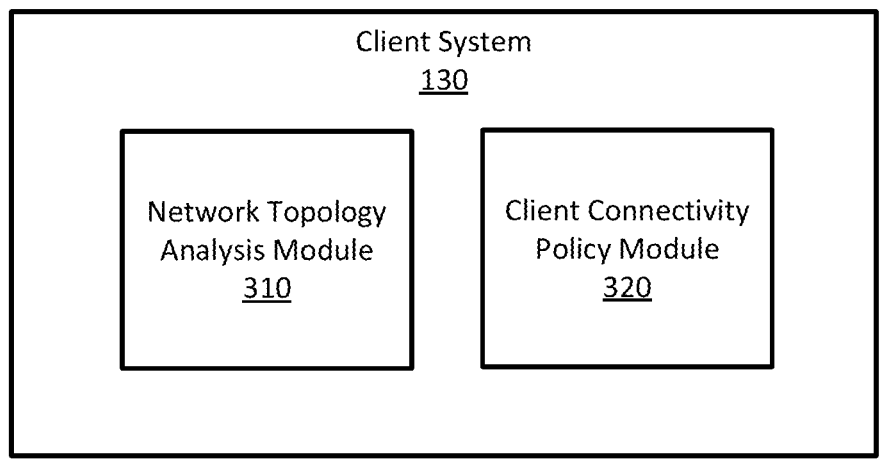
FIG. 3 is a block diagram illustrating a client system, according to an embodiment.

FIG. 3 is an embodiment of a block diagram illustrating a client system 130. In the embodiment shown, the client system 130 includes a network topology analysis module 310 and a client connectivity policy module 320. In other embodiments, the network security system 110 may include different or additional elements. Furthermore, the functionality may be distributed among the elements in a different manner than described.

The network topology analysis module 310 receives and processes information describing a network topology mapping of the network environment 120. In embodiments, the network topology analysis module 310 provides an interface for display by a computing device of the client system 130 which includes elements of the network topology mapping, such as a visualization of the network topology mapping. In particular, the network topology analysis module 310 can provide an interface identifying the network zones 124, the network devices 126, the network zone paths, or other elements of the network environment 120 included in the network topology mapping. In an embodiment, the interface provided by the network topology analysis module 310 displays the zone paths of the network environment 120 included in the network topology, and may further identify whether the zone paths are active, alternate, or rejected. The interface provided for display may further allow a user of the computing device to interact with various other elements of the network topology mapping in order to configure the network environment 120 or otherwise process information included in the network topology mapping. Additionally, the network topology analysis module 310 may allow a user of the computing device to submit tags for elements of the network topology mapping to the network security system 110 (e.g., for storage with the network topology mapping in the network topology store 230). By providing tags, the users of the computing device can alter how the network security system structures the network topology mapping and implements connectivity policies in the network environment 120. For example, if a network entity is included in multiple security zones 124, a user may submit a metadata tag for one of the multiple security zones 12 in order to restrict which security zones are used for the network entity, and consequentially which zone paths are used to implement connectivity policies for the network entity. In the above cases, the network topology analysis module 310 communicates with the network security system 110 in order to execute any configuring or reconfiguring of the network environment 120.

In some embodiments, the network topology analysis module 310 receives notifications from the network security system 110 describing changes to the network environment 120. For example, a system administrator or other individual may install a new security device 126 or add new computing devices to one or more security zones 124. In this case, the network topology analysis module 310 may receive a notification describing the new security device 126 or new computing device. In the same or different embodiments, the network topology analysis module 310 provides the received notification to the client connectivity policy module 320 in order to identify any appropriate adjustments to one or more current connectivity policies based on the notification, which is described in greater detail below.

The client connectivity policy module 320 communicates with the network security system 110 in order to implement client representations of connectivity policies. In embodiments, the client connectivity policy module 320 receives input from a user of the client system 130 specifying one or more parameters of a connectivity policy (e.g., which network entities of the network environment 120 can connect) and provides the client representation of the connectivity policy to the network security system 110. The connectivity policies received by the client connectivity policy module 320 may further include tags for elements of the network topology mapping (e.g., as provided by the network topology analysis module 310). The client connectivity policy module 320 may provide an interface for submitting connectivity policies or viewing current connectivity policies of the network environment 120, such as a user interface for display by the client system 130 or an application programming interface (API). For instance, the client connectivity policy module 320 may obtain the connectivity policies stored by the network security system 110 in the connectivity policy store 240. In some embodiments, the client connectivity policy module 320 facilitates both implementation of new connectivity policies in the network environment 120 and updates to existing connectivity policies. The client connectivity policy module 320 may communicate with the network security system using a generic application programming interface (API) associated with the network security system 110.

In some embodiments, the client system 130 displays one or more interfaces including information describing elements of the network topology mapping (e.g., provided by the network topology analysis module 310, as described above) and allowing a user of the client system 130 to submit connectivity policies (e.g., using the client connectivity policy module 320, as described above). For instance, the one or more interfaces may allow a user of the client system 130 to designate and submit a connectivity policy for implementation in the network environment 120 by interacting with information included in the network topology mapping.

FIGS. 4A-4E illustrate an embodiment of a process for discovering the elements of the network environment 120 and generating a network topology mapping 400 involving several stages. In the embodiment shown, the discovery process for generating the network topology mapping is performed as a consecutive series of stages. Broadly, the stages of the discovery process can be categorized as: 1) discovering the security zones of the network environment 120 based on the routes identified by routing information associated with security devices (e.g., the security devices 126) 2) determining the external entities connected to the network environment 120 and 3) identifying the zone paths for the network topology mapping. The FIGS. 4A-4E depict the discovery and generation process as a consecutive series of stages for the purposes of illustration, and in other embodiments the same or different stages may be performed in other orders or concurrently.

In the embodiment shown in FIGS. 4A-4E, the network security system 110 receives information describing characteristics of the network environment 120 which is used to perform the discovery process depicted in FIGS. 4A-4E. For example, the network security system 110 may be supplied with information describing characteristics of the network environment 120 from the client system 130. In particular, the information describing the security devices 126 may include the interfaces of the security devices (e.g., ethernet ports on a Firewall device) through which data is received and transmitted. The information describing the security devices 126 may further include tags assigned to the devices or their device interfaces. Additionally, the information describing the characteristics of the network environment 120 may include other information such as NAT rules or the external connections of the network environment 120. In the same or different embodiment than those shown in FIG. 4A-4E, the network security system 110 communicates with administrators of the network environment 120 (e.g., via the client system 130) during the stages of the discovery process in order to accurately determine or infer the structure of the network environment 120. For example, the administrators may submit tags for elements discovered during some or all of the stages of the discovery process to aid the network security system 110 in generating the network topology mapping 400.

Figure 4A:
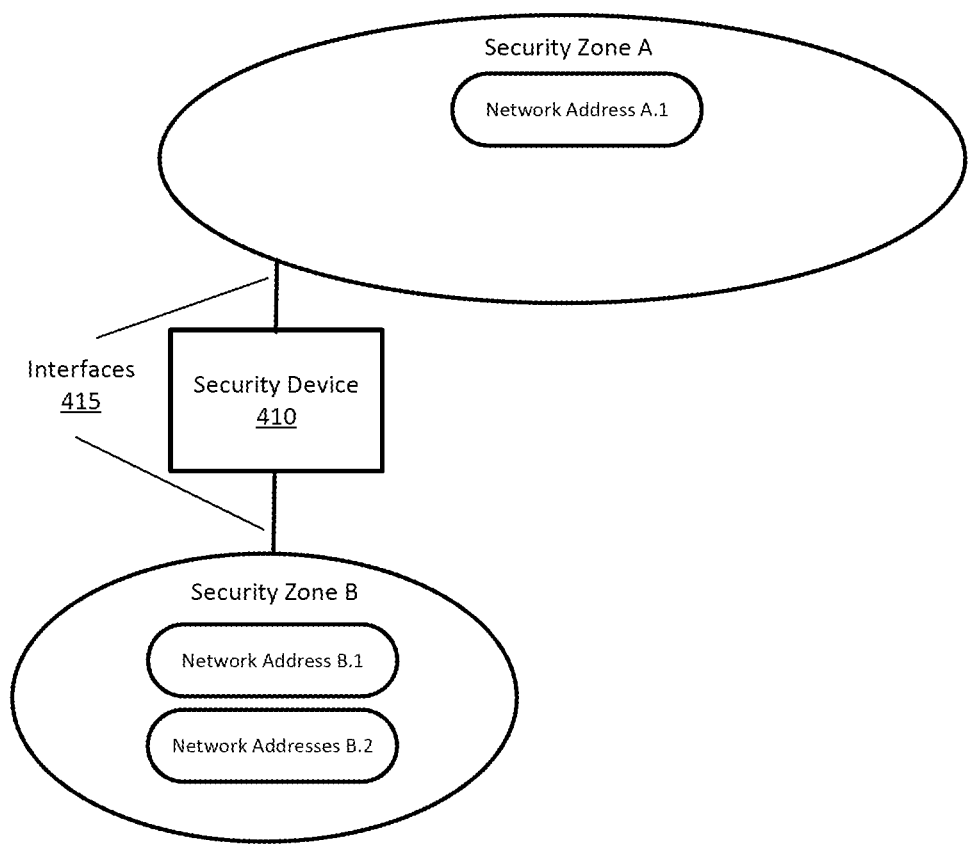
FIG. 4A illustrates a first stage of generating a network topology mapping for a network environment, according to an embodiment.

FIG. 4A illustrates an embodiment of a first stage of generating the network topology mapping 400 for the network environment 120 by the network security system 110. In the embodiment shown, the first stage includes the discovery of a set of routes identifiable from routing information associated with a security device 410 to network addresses in security zones accessible via the set of routes. For instance, the network security system 110 may identify the network addresses stored by the security device 410 in a network routing table). The network security system 110 can analyze the path of the set of routes identified from the routing information of the security device 410 through some or all of the security zones traversed by the routes in order to further infer the structure of the network environment 120. As depicted, the routing information of the security device 410 identifies routes to a network address A.1 via a first interface of the device interfaces 415 and to network addresses B.1 and B.2 via a second interface of the device interfaces 415. During the first stage, the network security system 110 determines that the network address A.1 belongs to a newly discovered security zone A and the network addresses B.1 and B.2 belong to a newly discovered security zone B.

Figure 4B:
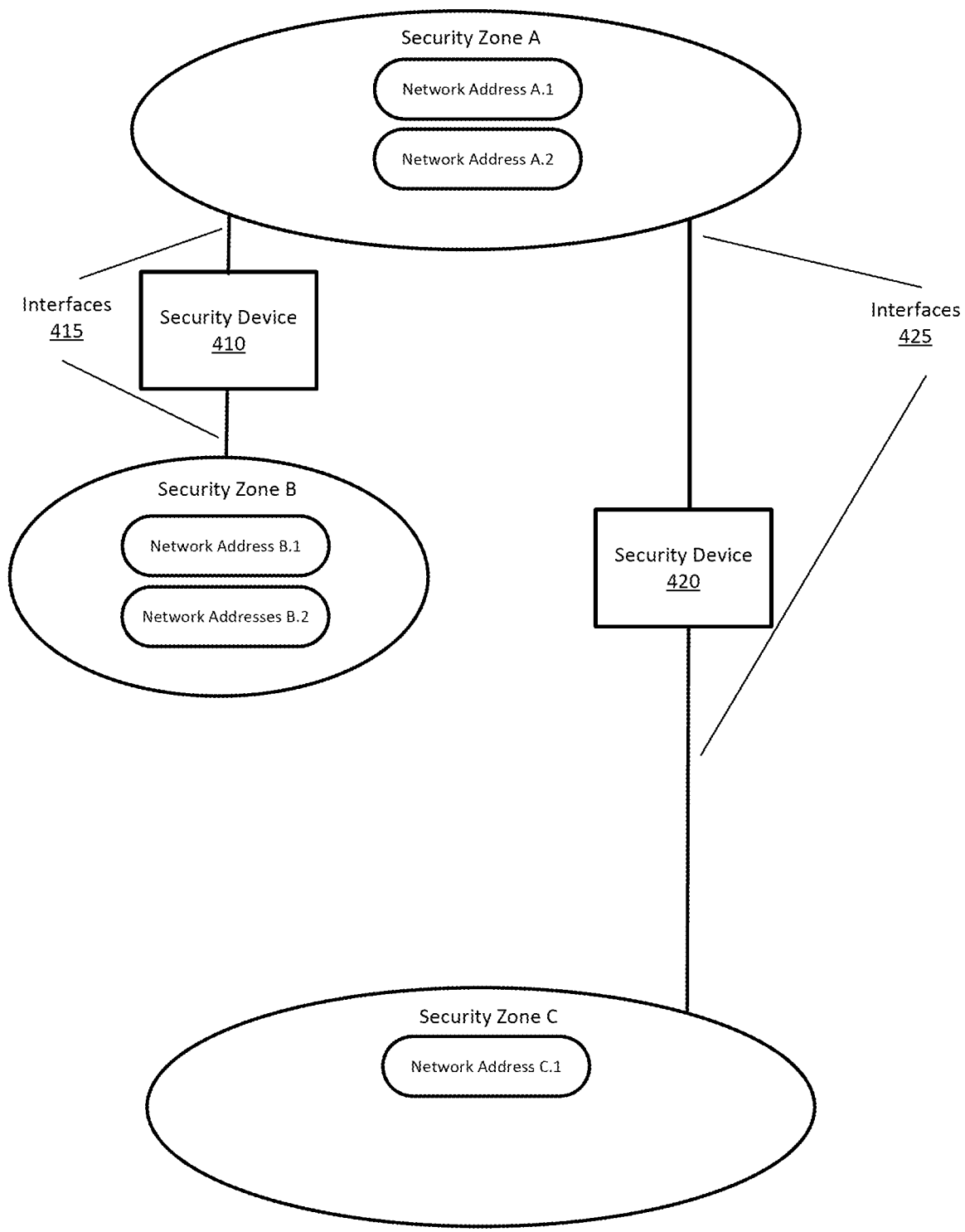
FIG. 4B illustrates a second stage of generating a network topology mapping for a network environment, according to an embodiment.

FIG. 4B illustrates an embodiment of a second stage of generating the network topology mapping 400 for the network environment 120 by the network security system 110. In the embodiment shown, the second stage includes the discovery of a set of routes identifiable from routing information associated with the security device 420 to network addresses in security zones accessible via the set of routes. Similarly to the security device 110, the network security system 110 can analyze the path of the set of routes identified from the routing information of the security device 420 through some or all of the security zones traversed by the routes in order to further infer the structure of the network environment 120. As depicted, the routing information of the security device 420 includes routes to network addresses A.1 and A.2 via a first interface of the device interfaces 425 and routes to network addresses C.1 via a second interface of the device interfaces 425. During the second stage, the network security system 110 determines that the network address A.2 belongs to the previously discovered security zone A and the network address C.1 belongs to a newly discovered security zone C. In an embodiment, the network security system 110 determines that a new network address (e.g., the network address A.2) belongs to a previously discovered security zone (e.g., the security zone A) by verifying that a connection exists from the new network address to any other security devices which border the previously discovered security zone (e.g., the security device 410).

Figure 4C:
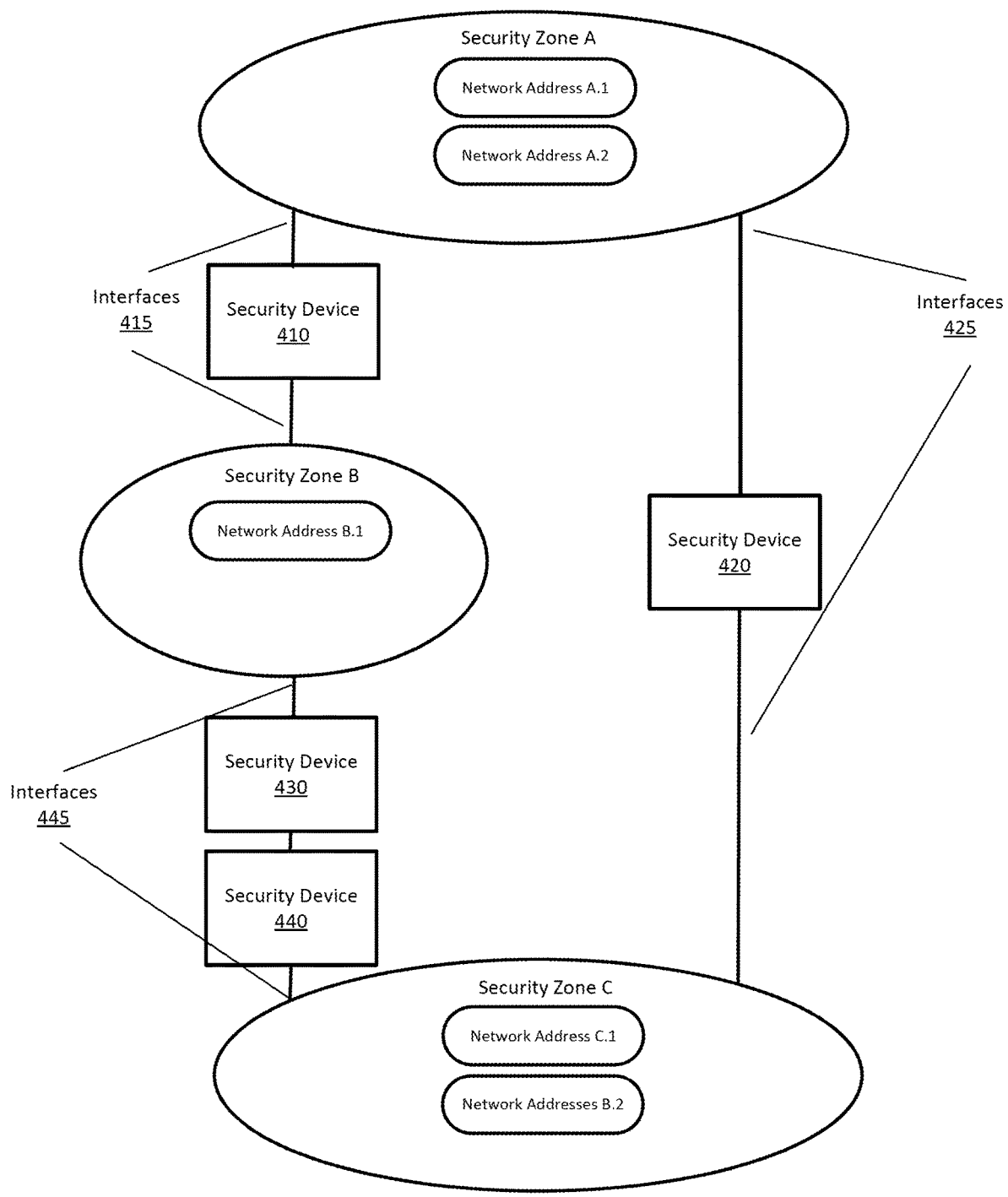
FIG. 4C illustrates a third stage of generating a network topology mapping for a network environment, according to an embodiment.

FIG. 4C illustrates an embodiment of a third stage of generating the network topology mapping 400 for the network environment 120 by the network security system 110. In the embodiment shown, the third stage includes the discovery of a set of routes identifiable from routing information of security devices 430 and 440 to network addresses in security zones accessible via the set of routes. As described above for the security devices 410 and 420, the network security system 110 can analyze the path of the set of routes identified from the routing information of the security devices 430 and 440 through some or all of the security zones traversed by the routes in order to further infer the structure of the network environment 120. As depicted, the routing of information of security devices 430 and 440 collectively includes routes to network address B.1 via a first interface of the device interfaces 445 and routes to network addresses C.1 and B.2 via a second interface of the device interfaces 445. During the third stage, the network security system 110 determines that the previously identified network address B.2 belongs to the previously discovered security zone C rather than the previously discovered security zone B, as determined during the first stage. In an embodiment, the network security system 110 determines that a previously identified network address (e.g., the network address B.2) belongs to a different security zone than previously determined when one or more security devices are identified as having routing information identifying routes which logically separate the security zone and the network address based on the device interfaces corresponding to the routes, as with the security devices 430 and 440 and the device interfaces 445.

Figure 4D:
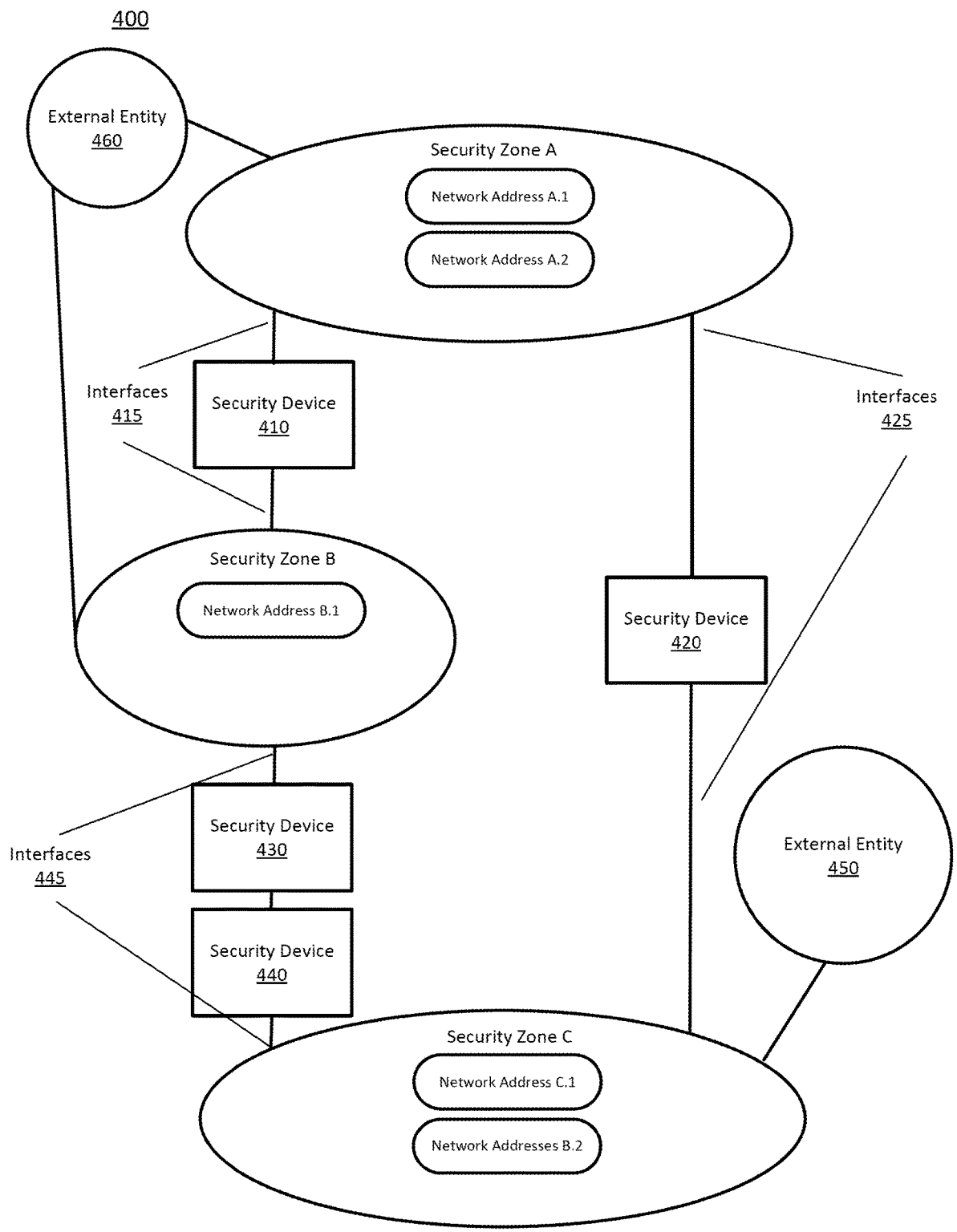
FIG. 4D illustrates a fourth stage of generating a network topology mapping for a network environment, according to an embodiment.

FIG. 4D illustrates an embodiment of a fourth stage of generating the network topology mapping 400 for the network environment 120 by the network security system 110. In the embodiment shown, the fourth stage includes discovering the location of external connections to external entities within the network environment 120. As depicted, the external entity 460 is connected to the network environment 120 through the security zone A and the security zone B. Similarly, the external entity 450 s connected to the network environment 120 through the security zone C.

Figure 4E:
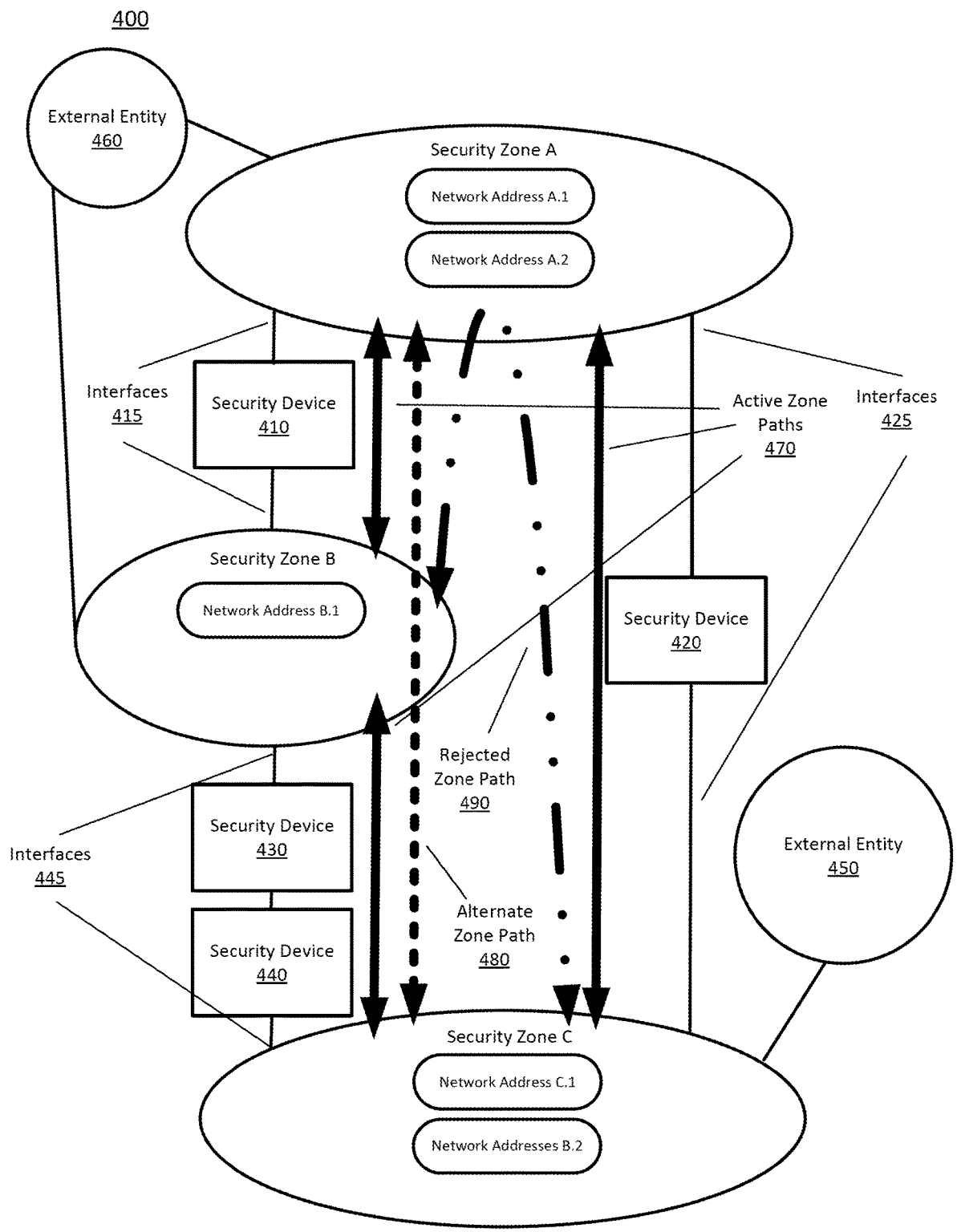
FIG. 4E illustrates a fifth stage of generating a network topology mapping for a network environment, according to an embodiment.

FIG. 4E illustrates an embodiment of a fifth stage of generating the network topology mapping 400 for the network environment 120 by the network security system 110. In the embodiment shown, the fifth stage includes discovering possible zone paths between the security zones A, B, and C identified in the first, second, and third stages described above. As depicted, the possible zone paths are designated as a set of active zone paths 470 (indicated using solid arrows), an alternate zone path 480 (indicated using a uniformly dashed arrow), and a rejected zone path 490 (indicated using a non-uniformly dashed line). After a possible zone path is identified, the network security system 110 may designate it as an active zone path by default As depicted in FIG. 4E, at some time after or during the identification of the possible zone paths, the network security system 110 received information designating a zone path as an alternate zone path (i.e., the alternate zone path 480) and designating a zone path as a rejected zone path (i.e., the rejected zone path 490).

Using the network topology mapping 400, the network security system 110 can configure the security devices 410, 420, 430, and 440 to implement connectivity policies for network addresses in the security zones A, B, and C and for communications with the external entities 450 and 460. For example, the network security system 110 can configure the security device 420 to implement a connectivity policy connecting the network address A.1 to the network address C.1 using an active zone path 470. Furthermore, the network security system 110 can configure the security devices 410, 420, or 430 to implement the same connectivity policy using the alternate zone path 480 if the active zone path 470 is unavailable (e.g., due to a network outage).

In some embodiments, the security zones A, B, and C include overlapping network addresses. For example, network address B.2 may be included in both security zone B and security zone C, such as if network entities within both security zone B and security zone C can communicate with network address B.2 without using a zone path.

Connectivity Policy Implementation

Figure 5:
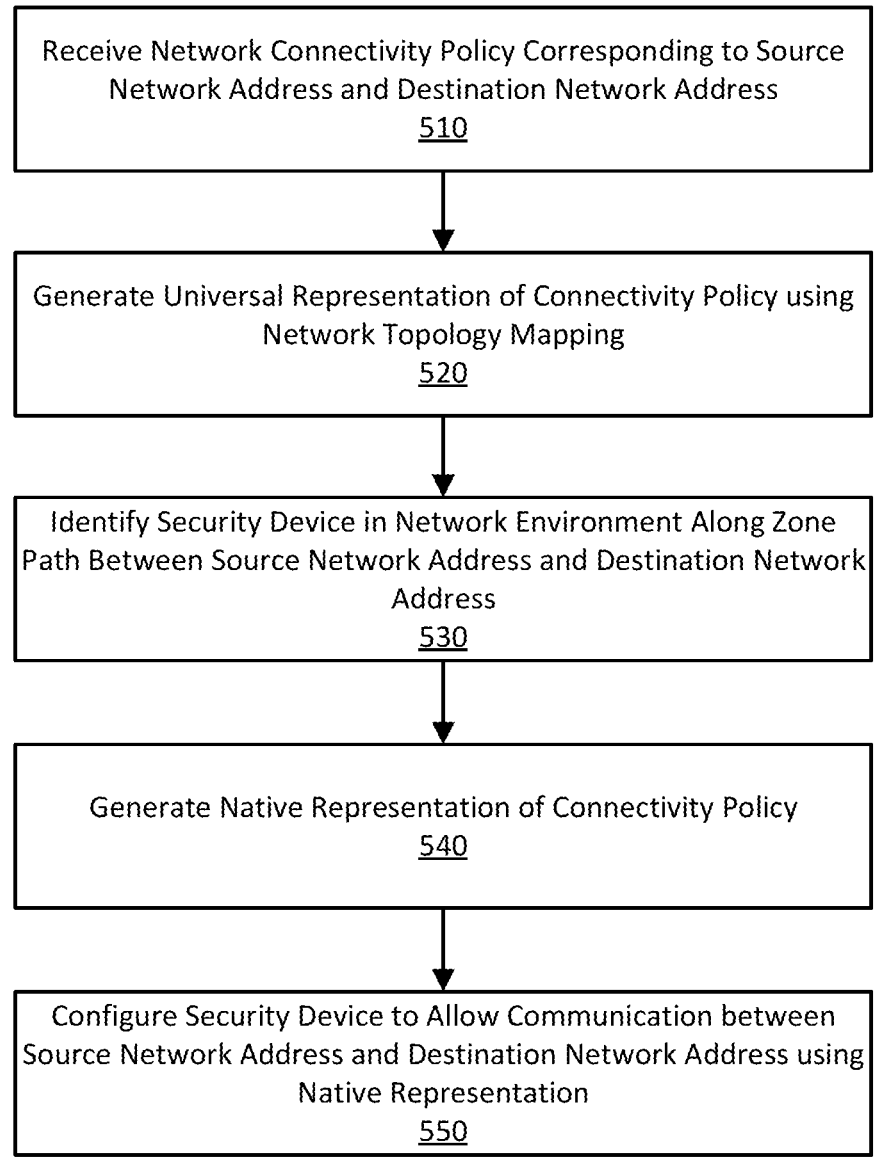
FIG. 5 is a flowchart illustrating a method for implementing a network connectivity policy using a universal representation and native representation of the connectivity policy, according to an embodiment.

FIG. 5 is a flowchart illustrating an embodiment of a method 500 for implementing a network connectivity policy using a universal representation and native representation of the connectivity policy. In the embodiment shown, the steps of FIG. 5 are illustrated from the perspective of a network security system 110 performing the method 500. However, some or all of the steps may be performed by other entities or components. In addition, some embodiments may perform different steps.

In the embodiment shown in FIG. 5, the method 500 begins with the network security system 110 receiving 510 a network connectivity policy for a source network address and a destination network address within a network environment (e.g., the network environment 120). For example, the connectivity policy implementation module 220 may receive a client representation of the connectivity policy from the client system 130. Using a network topology mapping of the network environment, the network security system 110 generates 520 a universal representation of the connectivity policy in a universal syntax of the network security system 110. For example, the connectivity policy implementation module 220 may identify the network addresses of network entities in the network environment relevant to the received connectivity policy, based on elements of a network topology mapping stored in the network topology store 230, including the source network address and the destination network address.

Using the network topology mapping, the network security system 110 identifies 530 a security device in the network environment along a network zone path between the source network address and the destination network address. For example, the connectivity policy implementation module 220 may identify the security device on a network zone path included in the network topology mapping between a security zone including the source network address and a security zone including the destination network address. Using the universal representation, the network security system 110 generates 540 a native representation of the connectivity policy in a native syntax associated with the identified security device. For example, the connectivity policy implementation module 220 may convert some or all of the universal representation to the native representation. Using the generated native representation, the network security system 110 configures 550 the security device to allow communication between for the source network address and the destination network address in accordance with the connectivity policy. As such, the network security system 110 configures the network environment to allow the source network address and the destination network address to communicate via the network zone path of the identified security device.

Figure 6:
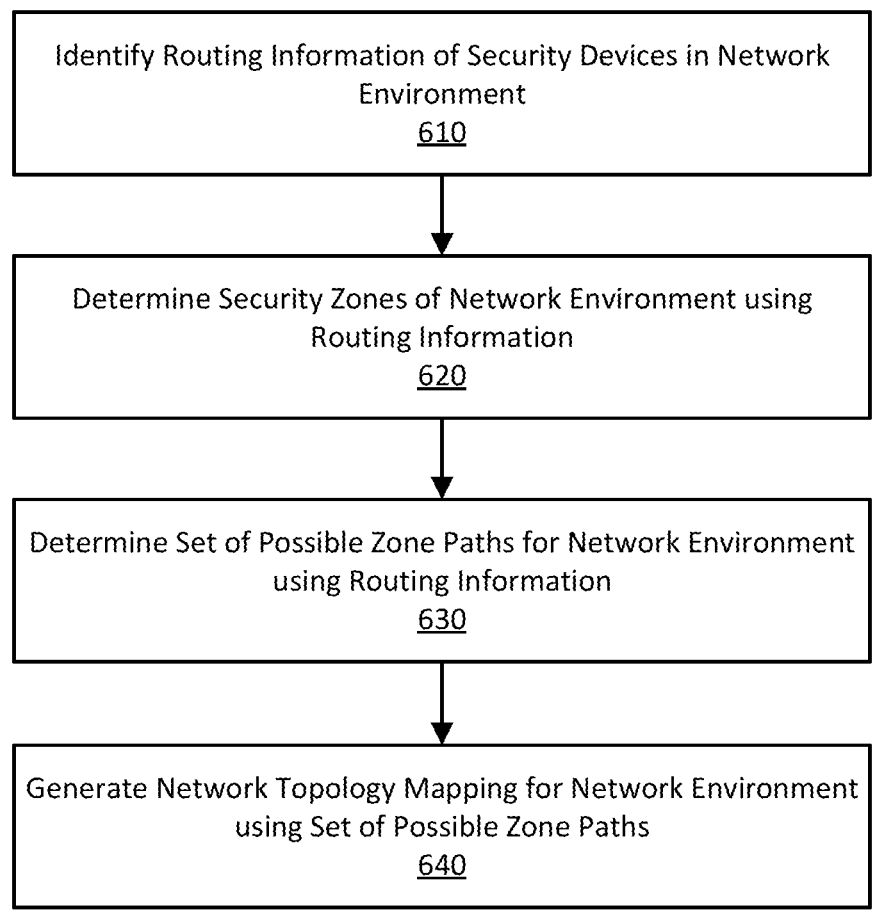
FIG. 6 is a flowchart illustrating a method for generating a network topology mapping for a network environment, according to an embodiment.

FIG. 6 is a flowchart illustrating an embodiment of a method 600 for generating a network topology mapping for a network environment. In the embodiment shown, the steps of FIG. 6 are illustrated from the perspective of a network security system 110 performing the method 600. However, some or all of the steps may be performed by other entities or components. In addition, some embodiments may perform different steps.

In the embodiment shown in FIG. 6, the method 600 begins with the network security system 110 identifying 610 routing information of one or more security devices (e.g., security devices 126) describing a set of routes to one or more network addresses the one or more security devices are configured to use. For example, the network topology module 210 may obtain the routing tables of the security device 126 included in the network environment 120. Using the routing information, the network security system 110 determines 620 security zones of the network environment which each include one or more network addresses. For example, the network topology module 210 may perform the discovery process depicted in FIGS. 4A-C to identify the security zones. Additionally, using the routing information, the network security system 110 determines 630 a set of possible zone paths for the network environment which each connect the one or more network addresses of a pair of security zones. In particular, the set of possible zone paths include an active zone path and an alternate zone path. For example, the network topology module 210 may identify the possible zone paths between each of the security zones 124 using the discovery process described in FIGS. 4A-4E. The active zone path and the alternate zone path may be designated as active and alternative, respectively, by an administrator of the network environment 110 or by a component of the network security system 110. The active zone path includes one or more security devices permitted (e.g., based on the active designation) to allow communication between the one or more network addresses connected by the active zone path. The alternative zone path includes one or more security devices permitted (e.g., based on the alternate designation) to allow communication between the one or more network addresses connected by the alternate zone path if the active zone path is unavailable. In other cases, the set of zone possible paths can include any other combination of zone paths designated as active zone paths, alternate zone paths, or rejected zone paths. Using the set of possible zone paths, the network security system 110 generates 640 a network topology mapping for the network environment 120. For example, the network topology module 210 may store the elements of the network topology mapping in the network topology store 230.

Figure 7:
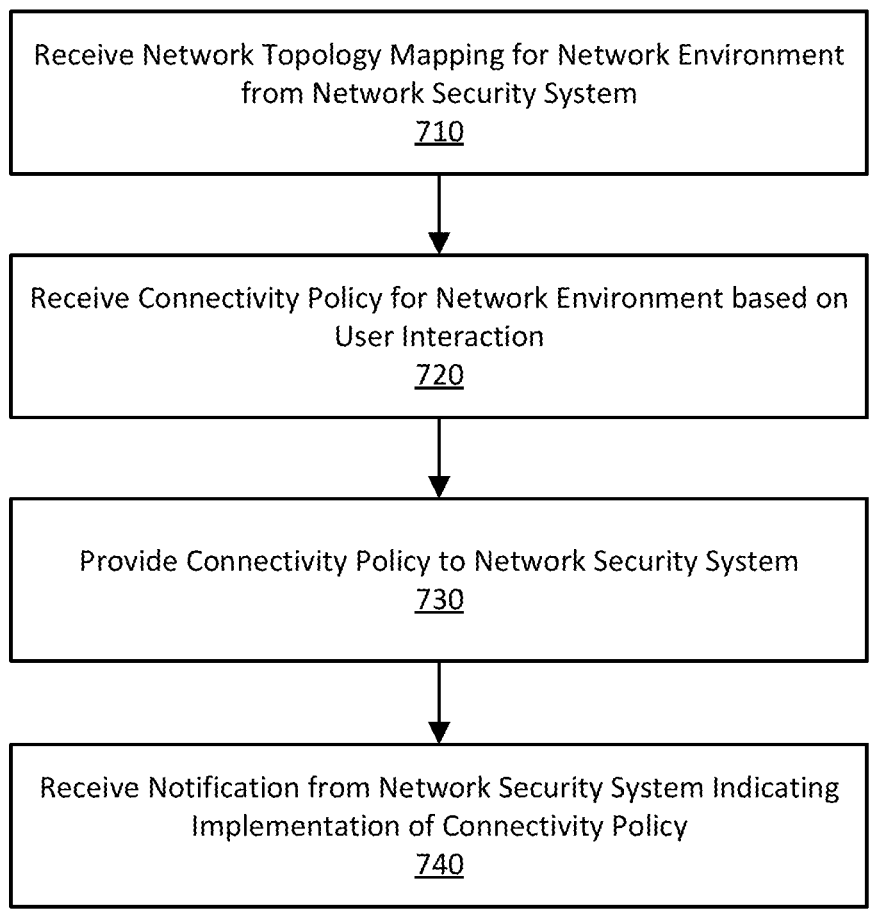
FIG. 7 is a flowchart illustrating a method for generating a network topology mapping for a network environment, according to an embodiment.

FIG. 7 is a flowchart illustrating an embodiment of a method 700 for providing a connectivity policy for implementation in the network environment 120. In the embodiment shown, the steps of FIG. 7 are illustrated from the perspective of the client device performing the method 700. However, some or all of the steps may be performed by other entities or components. In addition, some embodiments may perform different steps.

In the embodiment shown in FIG. 7, the method 700 begins with a client device (e.g., a computing device of the client system 130) receiving 710 a network topology mapping for a network environment from a network security system (e.g., the network security system 110). The network topology mapping includes security zones connected by zone paths through one or more security devices. For example, the client device may receive a network topology mapping for the network environment 120 from the network topology module 210 of the network security system 110. The client device receives a connectivity policy 720 for the network environment based on a user interaction with the client device. In particular, the connectivity policy specifies a source network address in a first security zone of the network topology mapping and a destination network address in a second security zone of the network topology mapping. For example, the network topology analysis module 310 or the client connectivity policy module 320 may provide an interface for display including information describing some or all of the network topology mapping, and allow a user to interact with the interface in order to input a client representation of a connectivity policy. The client device provides 730 the connectivity policy to the network security system. For example, the client connectivity policy module 320 may provide a client representation of the connectivity policy to the network security system 110. After providing 730 the connectivity policy to the network security system, the client device receives 740 a notification from the network security system indicating the connectivity policy was implemented in the network environment. In particular, the notification indicates that one or more security devices along one or more zone paths between the source network address and the destination network address were configured based on the connectivity policy. For example, the client device may receive a notification from the connectivity policy implementation module 220 of the network security system 110.

Computer System

Figure 8:
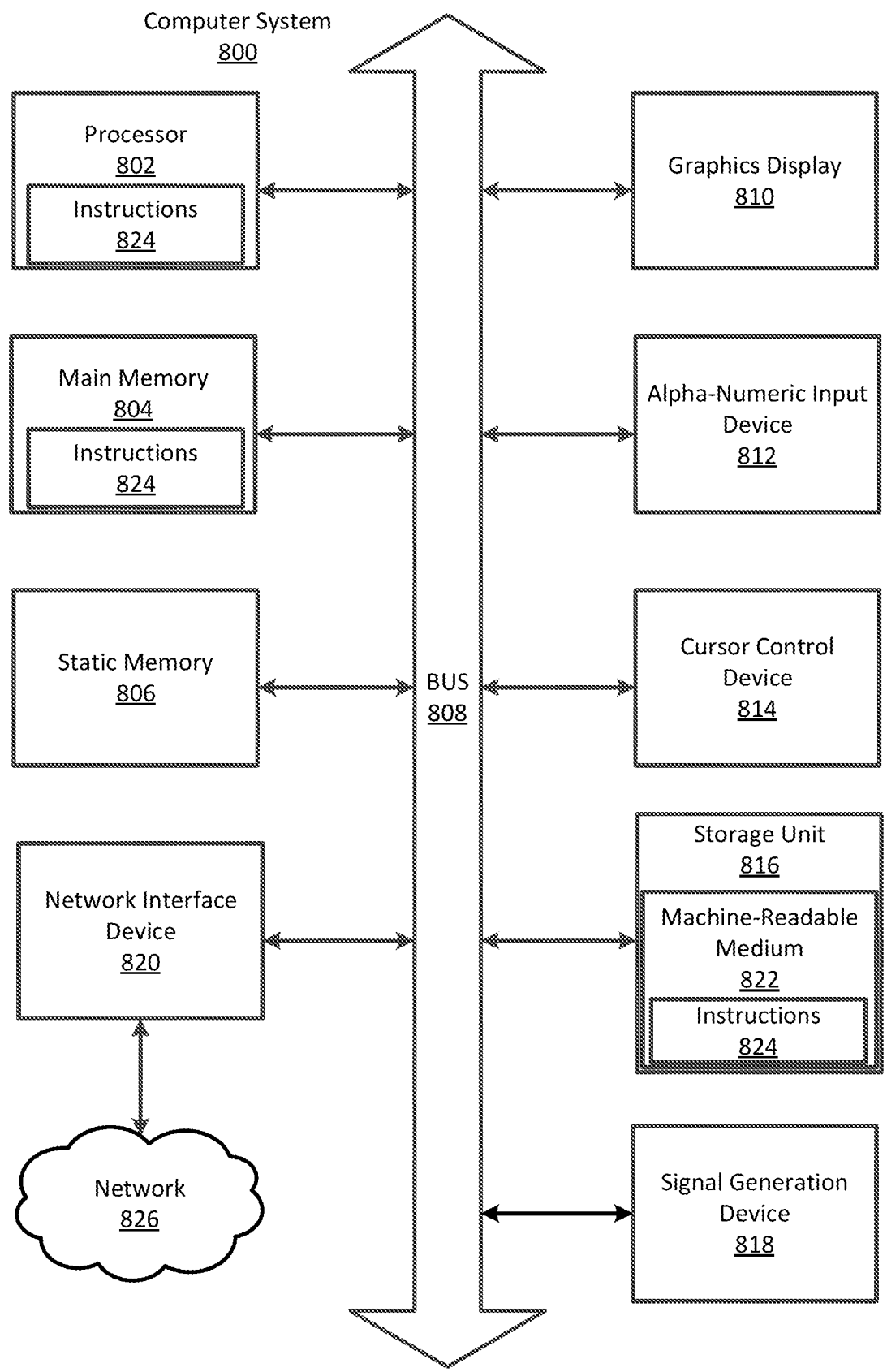
FIG. 8 illustrates a block diagram representing a computer system, according to an embodiment.

FIG. 8 illustrates a block diagram representing a computer system, according to one example embodiment. Specifically, FIG. 8 shows a diagrammatic representation of a computing device of network security system 110 or client system 130 in the example form of a computer system 800. The computer system 800 can be used to execute instructions 824 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment (e.g., environment 100), or as a peer machine in a peer-to-peer (or distributed) system environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 802). The processor 802 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 800 also includes a main memory 804. The computer system may include a storage unit 816. The processor 802, memory 804, and the storage unit 816 communicate via a bus 808.

In addition, the computer system 800 can include a static memory 806, a graphics display 810 (e.g., to drive a plasma display panel (PDP), a liquid crystal display (LCD), or a projector). The computer system 800 may also include alphanumeric input device 812 (e.g., a keyboard), a cursor control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. For example, the instructions 824 may include the functionalities of modules of the network security system 110 described in FIG. 1. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 826 (e.g., network 140) via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store the instructions 824. The term "machine-readable medium" shall also be taken to include any medium that is capable of storing instructions 824 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the disclosure may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the invention.

What is claimed is:

1. A computer-implemented method for configuring a network security device, the method comprising:
receiving, by a network security system, a connectivity policy for a network environment including a plurality of network addresses, the connectivity policy corresponding to a first network address and a second network address within a network environment;
generating a universal representation of the connectivity policy using a network topology mapping of the network environment, the network topology mapping including a set of possible zone paths for the network environment that connect the first network address and the second network address, wherein the set of possible zone paths includes:
an active zone path allowing communication between the first network address and the second network address; and
an alternate zone path allowing communication between the first network address and the second network address responsive to the active zone path becoming unavailable;
identifying, using the network topology mapping, a security device in the network environment on a network zone path between the first network address and the second network address, the security device configured to implement connectivity policies using a native syntax;

generating, based on the universal representation, a native representation of the connectivity policy in the native syntax; and configuring the security device to allow communication between the first network address and the second network address using the generated native representation.

2. The method of claim 1, further comprising:

receiving, by the network security system, an updated connectivity policy;

generating an updated universal representation of the updated connectivity policy in a universal syntax of the network environment;

generating an updated native representation of the updated connectivity policy in the native syntax; and reconfiguring the security device using the updated native representation.

3. The method of claim 1, further comprising:

identifying a network address translation (NAT) rule associated with the security device;

identifying a second security device in the network environment on the network zone path between the first network address and the second network address, the second security device configured to implement connections using a second native syntax;

generating, based on the universal representation, a second native representation of the connectivity policy in the second native syntax using the NAT rule; and configuring the second security device to allow communication between the first network address and the second network address using the second native representation.

4. The method of claim 1, further comprising:

identifying an update to the network topology mapping for the network environment;

generating, based on the update to the network topology mapping, an updated universal representation of the connectivity policy in a universal syntax of the network environment;

generating, based on the updated universal representation, an updated native representation of the updated connectivity policy in the native syntax; and reconfiguring the security device based on the updated native representation.

5. The method of claim 4, wherein the connectivity policy references an element of the network topology mapping, and wherein identifying the update to the network topology mapping further comprises:

determining that the element of the network topology mapping has changed.

6. The method of claim 4, further comprising:

providing a notification to a client device describing the update to the network topology mapping and the reconfiguring of the security device.

7. The method of claim 1, wherein receiving the connectivity policy comprises:

providing, by the network security system, information describing the network topology mapping to a client system; and receiving, from the client system, the connectivity policy.

8. The method of claim 1, wherein the security device borders a plurality of security zones, and the first network address and second network address are in first and second security zones of the plurality of security zones, respectively.

9. The method of claim 1 wherein the connectivity policy was received via a first connectivity policy channel, and further comprising:

receiving, by the network security system, an additional connectivity policy for the network environment via a second connectivity policy channel;

generating a combined universal representation of the connectivity policy and the additional connectivity policy in a universal syntax of the network environment; and configuring one or more security devices of the network environment using the combined universal representation to implement the connectivity policy and the additional connectivity policy in the network environment.

10. A computer-implemented method for configuring a network security device, the method comprising:

generating, using a network topology mapping of a network environment, a universal representation of a connectivity policy for the network environment, the network topology mapping including a set of possible zone paths for the network environment that connect a first network address and a second network address within the network environment, wherein the set of possible zone paths includes:

an active zone path allowing communication between the first network address and the second network address; and an alternate zone path allowing communication between the first network address and the second network address responsive to the active zone path becoming unavailable; and configuring a security device in the network environment to allow communication between the first network address and the second network address using a native representation of the connectivity policy, the security device identified using the network topology mapping.

11. The method of claim 10, further comprising:

receiving an updated connectivity policy;

generating an updated universal representation of the updated connectivity policy in a universal syntax of the network environment;

generating an updated native representation of the updated connectivity policy in a native syntax; and reconfiguring the security device using the updated native representation.

12. The method of claim 10, further comprising:

identifying a network address translation (NAT) rule associated with the security device;

identifying a second security device in the network environment on the network zone path between the first network address and the second network address, the second security device configured to implement connections using a second native syntax;

generating, based on the universal representation, a second native representation of the connectivity policy in the second native syntax using the NAT rule; and configuring the second security device to allow communication between the first network address and the second network address using the second native representation.

13. The method of claim 10, further comprising:

identifying an update to the network topology mapping for the network environment;

generating, based on the update to the network topology, an updated universal representation of the connectivity policy in a universal syntax of the network environment;

generating, based on the updated universal representation, an updated native representation of the updated connectivity policy in a native syntax; and reconfiguring the security device based on the updated native representation.

14. The method of claim 13, wherein the connectivity policy references an element of the network topology mapping, and wherein identifying the update to the network topology mapping comprises:

determining that the element of the network topology mapping has changed.

15. The method of claim 13, further comprising:

providing a notification to a client device describing the update to the network topology mapping and the reconfiguring of the security device.

16. A non-transitory computer-readable storage medium storing instructions that, when executed by a processor, cause the processor to perform operations for generating a network topology mapping, the operations comprising:

generating, using a network topology mapping of a network environment, a universal representation of a connectivity policy for the network environment, the network topology mapping including a set of possible zone paths for the network environment that connect a first network address and a second network address within the network environment, wherein the set of possible zone paths includes:

an active zone path allowing communication between the first network address and the second network address; and an alternate zone path allowing communication between the first network address and the second network address responsive to the active zone path becoming unavailable; and configuring a security device in the network environment to allow communication between the first network address and the second network address using a native representation of the connectivity policy, the security device identified using the network topology mapping.

17. The non-transitory computer-readable storage medium of claim 16, wherein the operations further comprise:

receiving an updated connectivity policy;

generating an updated universal representation of the connectivity policy in a universal syntax of the network environment;

generating an updated native representation of the updated connectivity policy in a native syntax; and reconfiguring the security device using the updated native representation.

18. The non-transitory computer-readable storage medium of claim 16, wherein the operations further comprise:

identifying a network address translation (NAT) rule associated with the security device;

identifying a second security device in the network environment on a network zone path between the first network address and the second network address, the second security device configured to implement connections using a second native syntax;

generating, based on the universal representation, a second native representation of the connectivity policy in the second native syntax using the NAT rule; and configuring the second security device to allow communication between the first network address and the second network address using the second native representation.

19. The non-transitory computer-readable storage medium of claim 16, wherein the operations further comprise:

identifying an update to the network topology mapping for the network environment;

generating, based on the update to the network mapping topology, an updated universal representation of the connectivity policy in a universal syntax of the network environment;

generating, based on the updated universal representation, an updated native representation of the updated connectivity policy in a native syntax; and reconfiguring the security device based on the updated native representation.

20. The non-transitory computer-readable storage medium of claim 19, wherein the connectivity policy references an element of the network topology mapping, and wherein identifying the update to the network topology mapping comprises:

determining that the element of the network topology mapping has changed.

* * * * *